(12) United States Patent
Lee et al.

(10) Patent No.: US 7,705,929 B2
(45) Date of Patent: Apr. 27, 2010

(54) LIQUID CRYSTAL DISPLAY

(75) Inventors: Chang Ho Lee, Gyeongsangbuk-do (KR); Yon Kon Lee, Seoul (KR); Oh Sang Kwon, Incheon (KR)

(73) Assignee: LG Display Co., Ltd., Seoul (KR)

( * ) Notice: Subject to any disclaimer, the term of this patent is extended or adjusted under 35 U.S.C. 154(b) by 258 days.

(21) Appl. No.: 11/640,308

(22) Filed: Dec. 18, 2006

(65) Prior Publication Data

US 2007/0296903 A1    Dec. 27, 2007

(30) Foreign Application Priority Data

Jun. 21, 2006   (KR) .................... 10-2006-0056120

(51) Int. Cl.
*G02F 1/1333*    (2006.01)

(52) U.S. Cl. ........................................ 349/59

(58) Field of Classification Search ............. 315/169.3, 315/273, 274; 349/58, 59, 60, 61, 64; 362/558, 362/561
See application file for complete search history.

(56) References Cited

U.S. PATENT DOCUMENTS

| | | | | |
|---|---|---|---|---|
| 5,847,792 A | * | 12/1998 | Kobayashi et al. | 349/110 |
| 6,633,360 B2 | * | 10/2003 | Okada et al. | 349/145 |
| 6,933,990 B2 | * | 8/2005 | Park | 349/59 |
| 6,934,098 B2 | * | 8/2005 | King et al. | 360/2 |
| 6,971,780 B2 | * | 12/2005 | Lee et al. | 362/561 |

* cited by examiner

*Primary Examiner*—Douglas W Owens
*Assistant Examiner*—Minh D A
(74) *Attorney, Agent, or Firm*—Holland & Knight LLP (57) ABSTRACT

A liquid crystal display device includes a liquid crystal display panel, a plurality of lamps for irradiating light onto the liquid crystal display panel, a cover bottom that houses the plurality of lamps, an inverter printed circuit board having a first surface and a second surface opposite to the first surface with an insulation base layer between the first and second surfaces, wherein the second surface is adjacent to the cover bottom, a transformer on the first surface of the inverter printed circuit board, and a metal shielding pattern on the second surface of the inverter printed circuit board directly between the transformer and the cover bottom.

12 Claims, 7 Drawing Sheets

LIQUID CRYSTAL DISPLAY

This application claims the benefit of the Korean Patent Application No. P06-0056120 filed on Jun. 21, 2006, which is hereby incorporated by reference in its entirety.

BACKGROUND OF THE INVENTION

1. Field of the Invention

Embodiments of the invention relate to a display device, and more particularly to a liquid crystal display device. Although embodiments of the invention are suitable for a wide scope of applications, it is particularly suitable for an inverter circuit that supplies power to a backlight of a liquid crystal display device.

2. Description of the Related Art

As the information society develops, the need for display devices in various shapes increases. Various types of flat panel display devices have been developed, such as LCD (liquid crystal display), PDP (plasma display panel), ELD (electro luminescent display) and VFD (vacuum fluorescent display). The liquid crystal display device is the flat panel display device that has been more widely used than any other types of display devices because the liquid crystal display device has the combined characteristics of low power consumption and high picture quality.

Generally, the liquid crystal display device controls light transmittance of a layer of liquid crystal molecules by using an electric field to display a picture. To this end, the liquid crystal display device includes a liquid crystal display module, a drive circuit for driving the liquid crystal display module, and a case. The liquid crystal display module includes a liquid crystal display panel and a backlight assembly, which irradiates light onto the liquid crystal display panel. The liquid crystal display panel and the backlight assembly are combined together into a liquid crystal display module so as to prevent light loss.

The liquid crystal display panel includes two substrates which face each other, and a liquid crystal interposed between the two substrates. One of the two substrates has thin film transistors (hereinafter, referred to as 'TFT') and is referred to as an array substrate. The other of the two substrates has color filters and is referred to as a color filter substrate. The liquid crystal display panel is a non-emissive type of display panel that uses light from the backlight assembly to display a picture.

A backlight assembly can either be an edge type or a direct type depending on the location of the light sources within the backlight. In the edge type, the light source of the backlight is located at the side surface of the liquid crystal display panel and the light is supplied through a waveguide. In the direct type, a plurality of light sources is located directly under the liquid crystal display panel.

Recently, the liquid crystal display device has been enlarged and is now more commonly used in televisions. The direct type backlight is mainly used for a liquid crystal display device in a television because high brightness can be obtained. The light source used in the backlight can be a cold cathode fluorescent lamp (CCFL) or an external electrode fluorescent lamp (EEFL).

Figure 1:
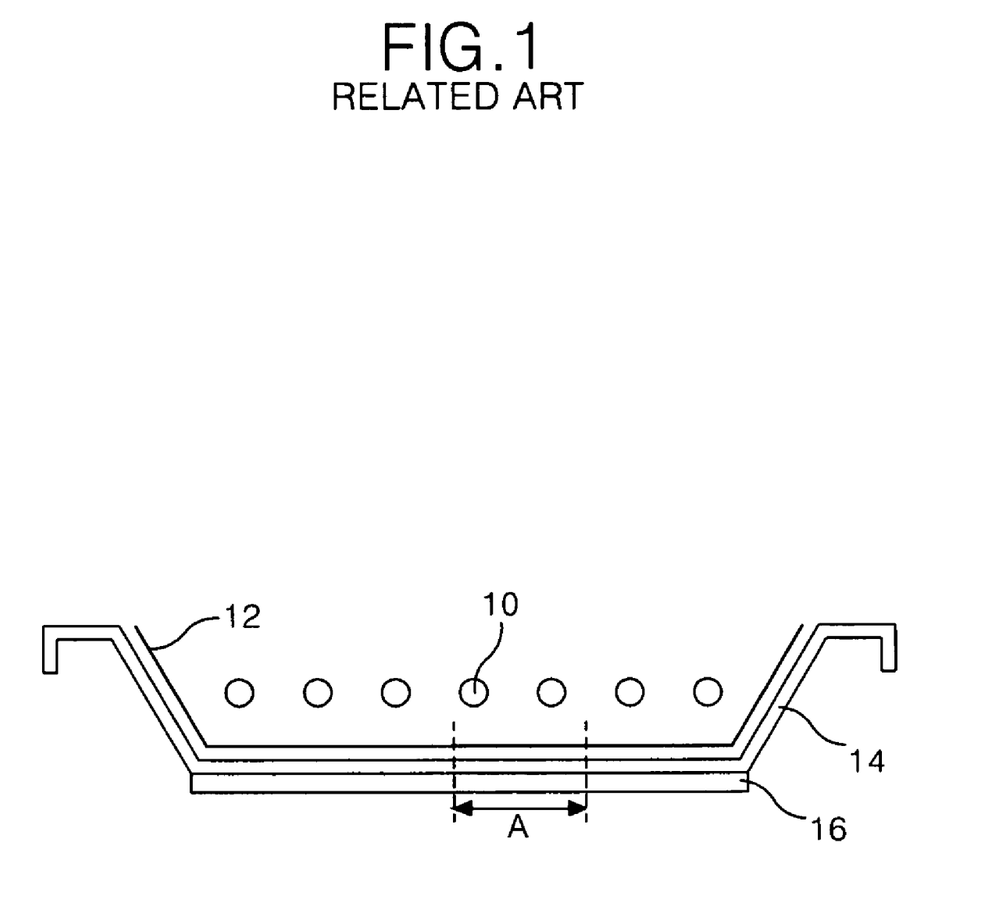
FIG. 1 is a cross-sectional diagram representing a direct backlight assembly of the related art.
Figure 2:
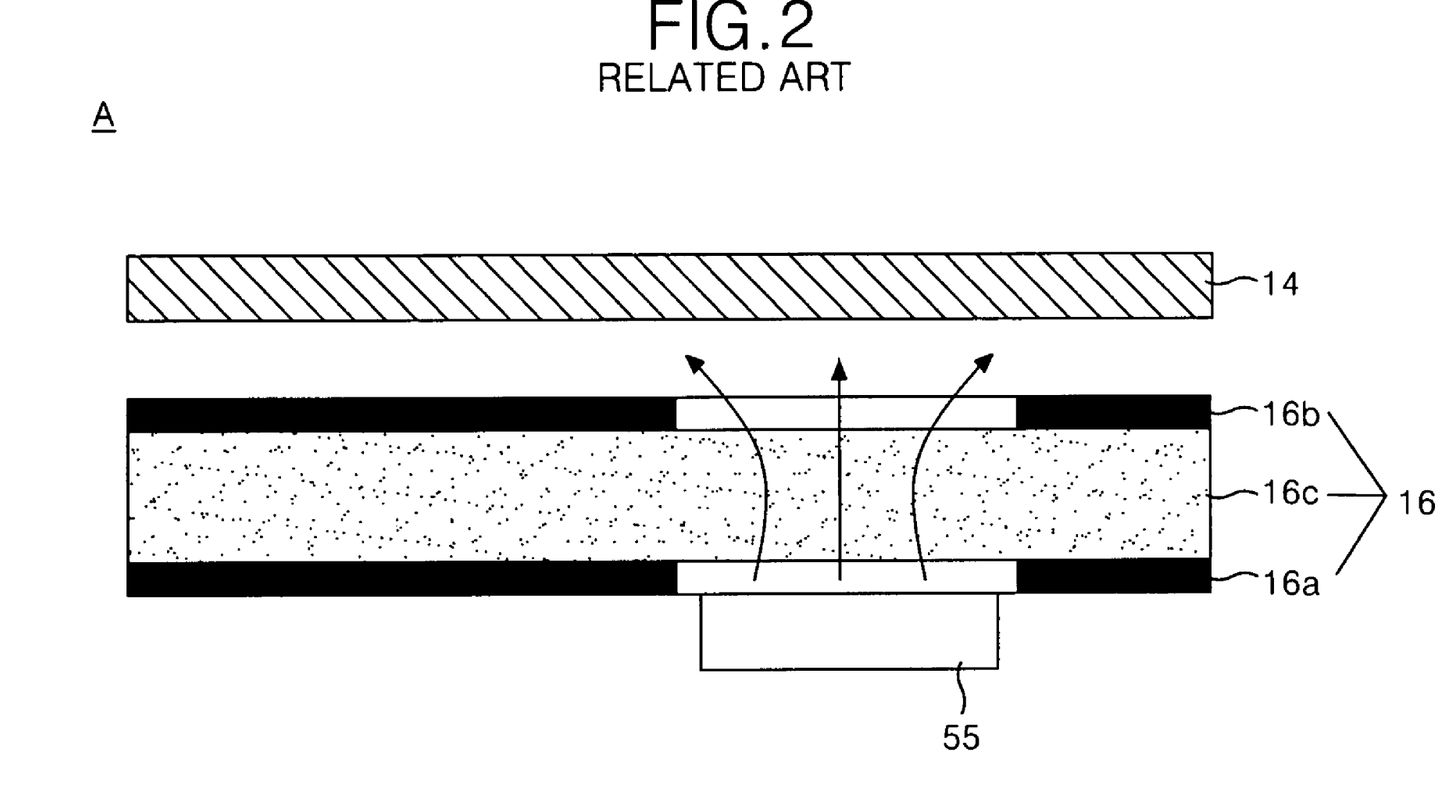
FIG. 2 is an enlarged diagram of part 'A' of FIG. 1.

FIG. 1 is a cross-sectional diagram representing a direct type backlight assembly of the related art, and FIG. 2 is an enlarged diagram of part 'A' in FIG. 1. Referring to FIGS. 1 and 2, the direct type backlight assembly includes lamps 10, a cover bottom 14 that houses the lamps 10, a reflection sheet 12 installed inside the cover bottom 14, and an inverter printed circuit board (hereinafter, referred to as 'PCB') 16 disposed outside of the cover bottom 14. A diffusion plate is positioned over the cover bottom 14 that houses the lamps 10, and a plurality of optical sheets are deposited on the diffusion plate.

The cover bottom 14 includes a bottom surface and side surfaces. The reflection sheet 12 is adhered to the inside of the bottom surface and side surfaces of the bottom cover 14 with double faced tape. The reflection sheet 12 reflects the light incident from the lamps 10 to the front of the backlight assembly.

The lamps 10 are external electrode fluorescent lamps (EEFL) that are arranged in parallel. An external electrode fluorescent lamp has a glass tube in which phosphorus is spread over the inner wall of the glass tube. Then, an inert gas is injected into the glass tube and external electrodes are installed at both ends of the glass tube.

The inverter PCB 16 is disposed on the outside bottom surface of the cover bottom 14. A transformer 55 for driving the lamps 10 is mounted on the inverter PCB 16, as shown in FIG. 2. An inverter circuit (not shown) is also on the inverter PCB 16. The inverter circuit includes a switching part (not shown) that receives DC power from an external power supply for conversion into an AC signal, a transformer 55 that boosts the AC signal generated from the switching part to supply a boosted AC signal to the lamps 10, and a controlling part that detects current supplied to the lamps 10 so as to control the switching part.

The lamps 10 can be driven by an inverter circuit using an individual drive method in which lamps correspond to transformers in a one-to-one relation. In the alternative, the lamps 10 can be driven in a parallel method in which a plurality of lamps correspond to one transformer in a many-to-one relation. In the case of the individual drive method, one transformer is used for driving one lamp, so that a low-current output transformer can be used to drive the single lamp. In the case of the parallel drive method, many lamps are driven by one transformer so that a high-current output transformer is used to provide power to a plurality of lamps.

Figure 3:
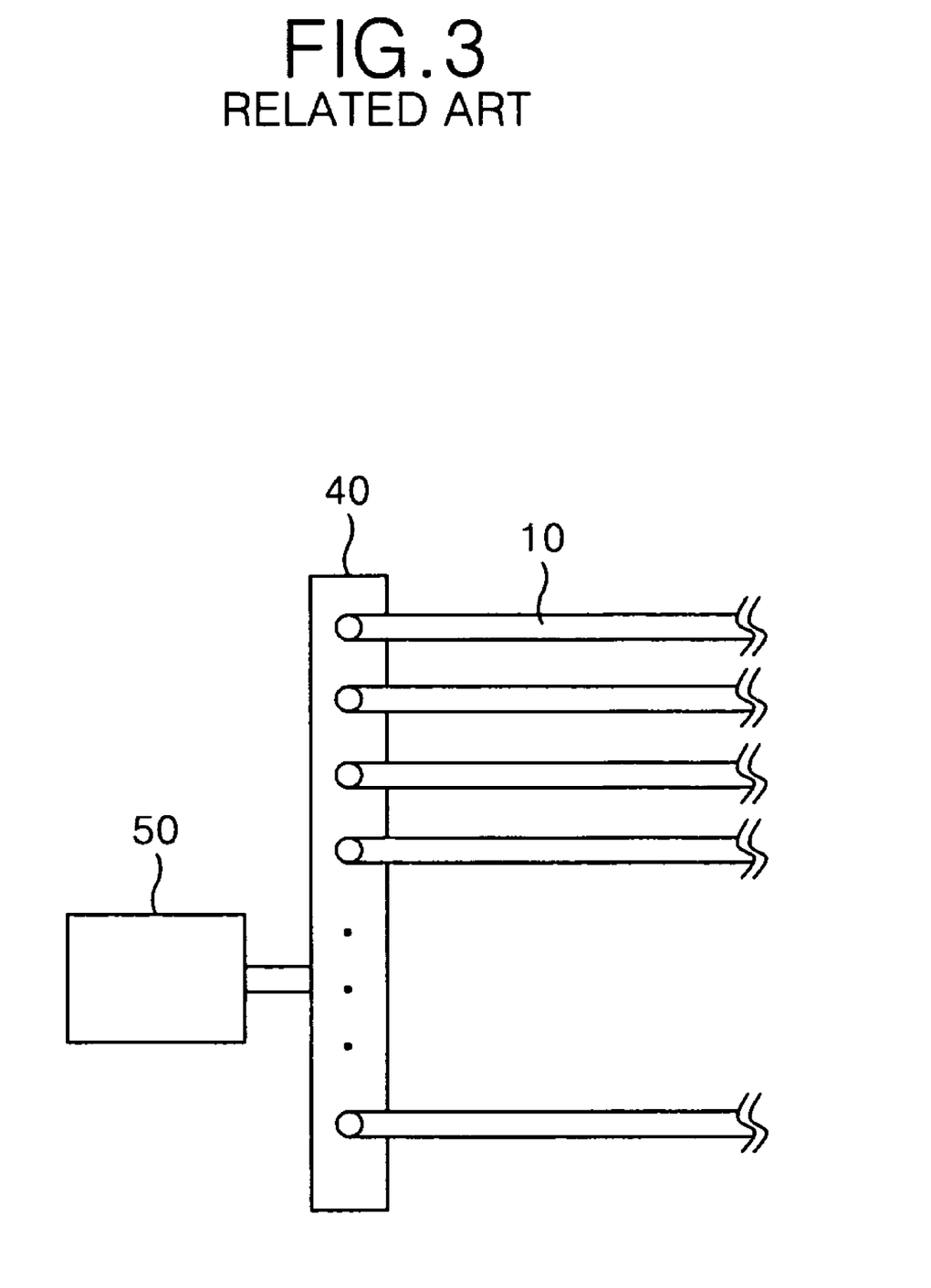
FIG. 3 is a diagram showing a parallel drive method where a plurality of lamps are driven using one high output transformer.

FIG. 3 is a diagram showing a parallel drive method in which a plurality of lamps are driven using a single high-current output transformer. External electrode fluorescent lamps can be driven by the parallel drive method, as shown in FIG. 3. More specifically, a plurality of external electrode fluorescent lamps 10 can be commonly connected to a common electrode 40 to receive a high voltage AC from the inverter circuit 50.

As shown in FIG. 2, the inverter circuit 50 includes the high-current output transformer 55 mounted on the inverter PCB 16. The inverter PCB 16 includes an epoxy glass fiber substrate 16C, and first and second copper thin film layers 16A and 16B, which are coated onto the upper and lower surfaces of the glass fiber substrate 16C. The copper thin films are not located on areas of the upper and lower surfaces of the inverter PCB 16 that correspond to an area where the transformer 55 is mounted on the inverter PCB 16. In the case of the upper surface of the inverter PCB 16 closest to the high output of the transformer 55, an area of the copper thin film 16a is omitted to prevent the risk of discharge due to a high voltage output from the high voltage output of the transformer 55 to the copper film 16a. On the other hand, in the case of the lower surface of the inverter PCB 16 adjacent to the high output of the transformer 55, an area of the copper thin film 16b is omitted in consideration of an insulating internal pressure of the inverter PCB 16.

In the liquid crystal display device of the related art, as described above, the copper thin film 16b is omitted at the lower surface of the inverter PCB 16 which corresponds to a mounting area of the high output transformer 55 so that magnetic flux generated from the high output transformer 55 impact the outside surface of the cover bottom 14. The number of magnetic fluxes impacting thereto, i.e., the number of leaked magnetic fluxes, increases as the output voltage of the high output transformer 55 increases. As a result of the impacting magnetic fluxes, eddy current flows along the outside surface of the cover bottom 14. The eddy currents cause a localized heating in the cover bottom 14. The localized heating of the cover bottom 14 heats up the high output transformer 55 of the liquid crystal display device of the related art so as to cause the high output of the transformer 55 to operate inefficiently and waste power.

SUMMARY OF THE INVENTION

Accordingly, embodiments of the invention are directed to a liquid crystal display device that substantially obviates one or more of the problems due to limitations and disadvantages of the related art.

An object of embodiments of the invention is to prevent magnetic flux leakage between a transformer and a cover bottom of a liquid crystal display device.

Another object of embodiments of the invention is to reducing power consumption in a backlight of a liquid crystal display.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other objects of the invention, a liquid crystal display device includes a liquid crystal display panel, a plurality of lamps for irradiating light onto the liquid crystal display panel, a cover bottom that houses the plurality of lamps, an inverter printed circuit board having a first surface and a second surface opposite to the first surface with an insulation base layer between the first and second surfaces, wherein the second surface is adjacent to the cover bottom, a transformer on the first surface of the inverter printed circuit board, and a metal shielding pattern on the second surface of the inverter printed circuit board directly between the transformer and the cover bottom.

In another aspect, a liquid crystal display device includes a liquid crystal display panel, a plurality of lamps for irradiating light onto the liquid crystal display panel, a cover bottom that houses the plurality of lamps, a reflection sheet adhered to an inside surface of the cover bottom, an inverter printed circuit board at an outside surface of the cover bottom, a transformer on a first surface of the inverter printed circuit board, and a metal shielding pattern positioned on the inverter printed circuit board directly between the transformer and the cover bottom.

In another aspect, a liquid crystal display device includes a liquid crystal display panel, a plurality of lamps for irradiating light onto the liquid crystal display panel, a cover bottom that houses the plurality of lamps, an inverter printed circuit board having a first surface and a second surface opposite to the first surface with an insulation base layer between the first and second surfaces, wherein the second surface is adjacent to the cover bottom, a transformer on the inverter printed circuit board, a metal shielding pattern on the first surface of the inverter printed circuit board directly between the transformer and the cover bottom; and second metal patterns on the second surface of the inverter printed circuit board, wherein the metal shielding pattern is electrically isolated from the second metal pattern.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

In the drawings.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 4:
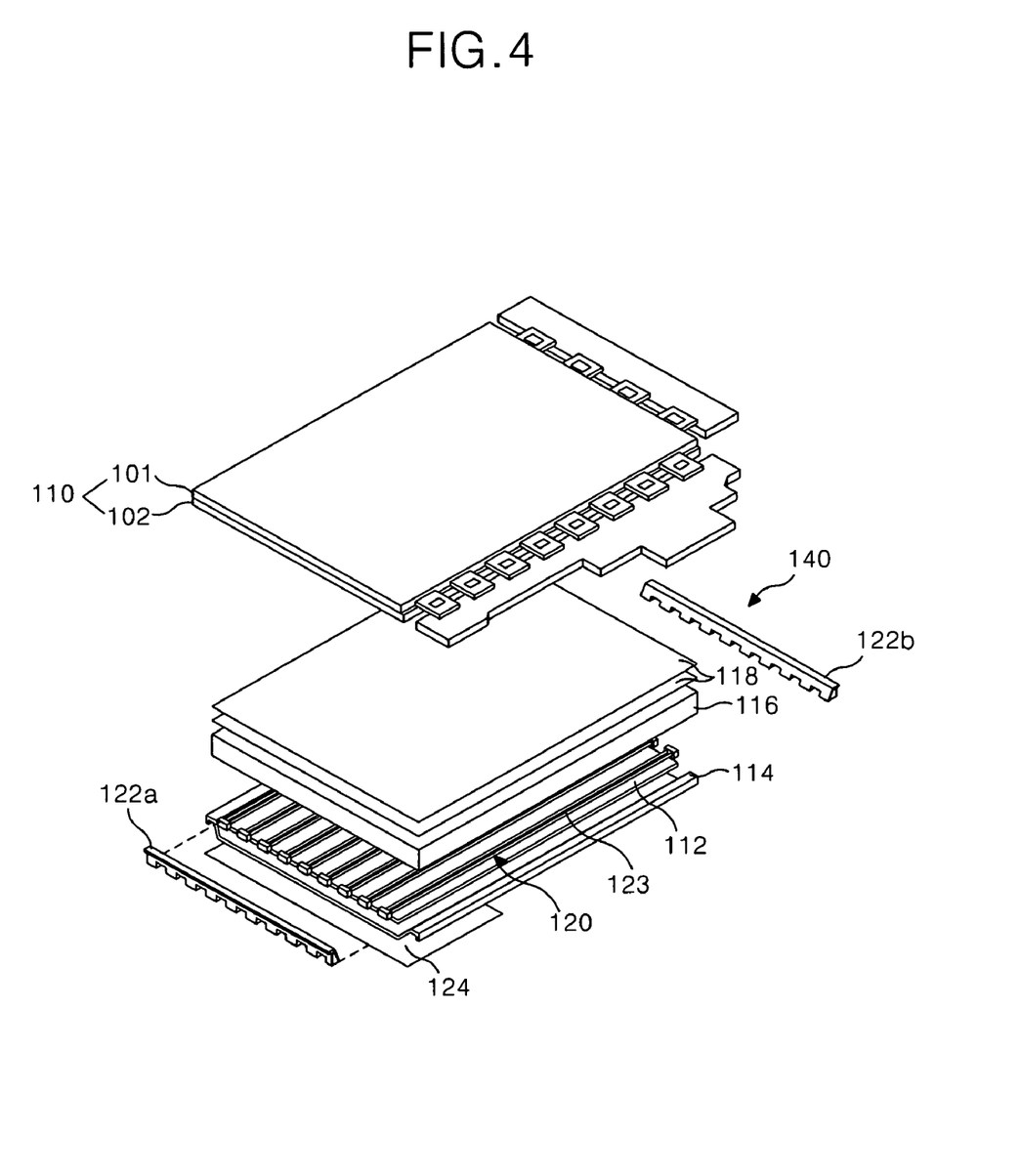
FIG. 4 is an exploded perspective plan view of a liquid crystal display device according to an embodiment of the invention.
Figure 5:
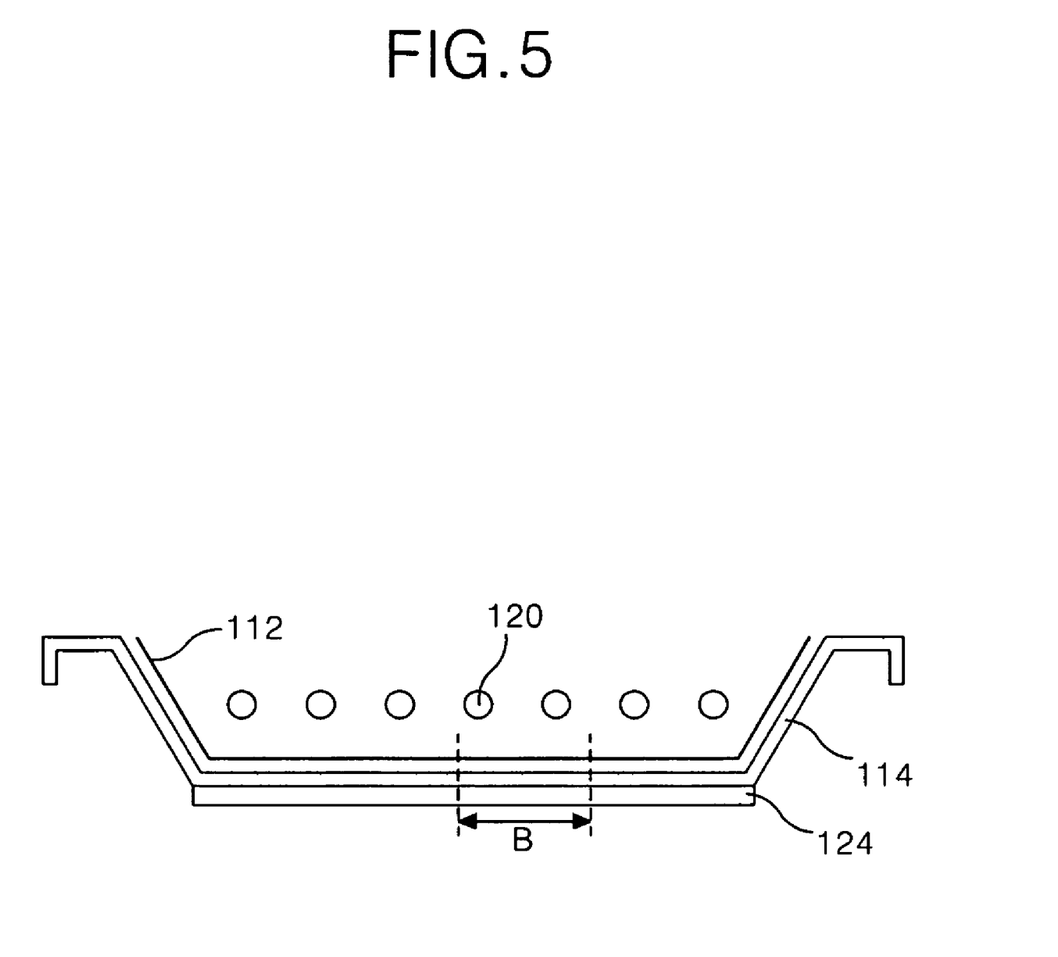
FIG. 5 is a cross-sectional diagram of the direct type backlight assembly shown in FIG. 4.

FIG. 4 is an exploded perspective plan view of a liquid crystal display device according to an embodiment of the invention, and FIG. 5 is a cross-sectional diagram of the direct type backlight assembly shown in FIG. 4. Referring to FIGS. 4 and 5, a liquid crystal display device according to embodiments of the invention includes a liquid crystal display panel 110 and a direct type backlight assembly 140, which irradiates light onto the liquid crystal display panel 110.

Liquid crystal molecules are positioned between an upper substrate 101 and a lower substrate 102 of the liquid crystal display panel 110. A color filter (not shown), a common electrode (not shown) and a black matrix (not shown) are formed on the upper substrate 101 of the liquid crystal display panel 110. Signal lines (not shown), such as data lines and gate lines, are formed on the lower substrate 102 of the liquid crystal display panel 110. Thin film transistors (TFTs) are formed at each data lines and gate line crossing. Each TFT switches a data signal, which is to be transmitted to a liquid crystal cell from the data line, in response to a scan signal (gate pulse) from the gate line. A pixel electrode (not shown) is formed in a pixel area between crossing data and gate lines.

The direct type backlight assembly 140 includes a plurality of lamps 120 for irradiating light toward the liquid crystal display panel 110, a cover bottom 114 that houses the plurality of lamps 120, a non-metal reflection sheet 112 is adhered to the inside surface of the cover bottom 114 to reflect the light from the plurality of lamps 120 to the liquid crystal display panel 110, support sides 122a and 122b installed at both sides of the cover bottom 114 for supporting both ends of the plurality of lamps 120, an inverter PCB 124 disposed at the outside of the bottom surface of the cover bottom 114, a diffusion plate 116 positioned between the plurality of lamps 120 and the liquid crystal display panel 110 for diffusing the light from the plurality of lamps 120, and a plurality of optical sheets 118 deposed between the diffusion plate 116 and the liquid crystal display panel 110.

Each of the plurality of lamps 120 is an external electrode fluorescent lamp formed of a glass tube 123 in which a discharge gas (or inert gas) is sealed and external electrodes are formed on the external surface of the glass tube 123. The external electrodes are at the ends of the glass tube 123. The plurality of lamps 120 are arranged in parallel within the cover bottom 114 and both external electrodes are supported by the support sides 122a and 122b.

The reflection sheet 112 reflects the light generated from the plurality of lamps 120 to redirect the light toward the liquid crystal display panel 110, thereby improving light efficiency. The diffusion plate 116 diffuses the light from the plurality of lamps 120 to provide uniform light to the liquid crystal display panel 110. The optical sheets 118 direct the diffused light from the diffusion plate 116 in a path toward the liquid crystal display panel 110 as well as diffuse the light so as to improve the efficiency of the light irradiated onto the liquid crystal display panel 110 and increase the uniformity of the light irradiated onto the liquid crystal display panel 110. The optical sheets 118 can include one or more prism sheets and one or more diffusion sheets.

The support sides 122a and 122b are made of a molded plastic. Electrodes (not shown) for applying voltages to the external electrodes of the plurality of lamps 120 are formed inside the support sides 122a and 122b. The external electrodes of the plurality of lamps 120 are inserted into the support sides 122a and 122b such that the electrodes of the support sides 122a and 122b are connected to the external electrodes.

The cover bottom 114 includes a bottom surface and side surfaces, which are at an angle with respect to the bottom surface. The plurality of lamps 120 are housed within the space defined by the bottom surface and side surfaces of the cover bottom 114. The inverter PCB 124 is disposed on the outside of the bottom surface of the cover bottom 114.

The inverter PCB 124 has an inverter circuit, which includes a transformer for driving the lamps 120. The inverter circuit includes a switching part (not shown) that receives DC power from an external power supply (not shown) and converts the DC power into an AC signal, a transformer (not shown) that boosts the AC signal generated from the switching part to supply a boosted AC signal to the plurality of lamps 120, and a controlling part (not shown) for detecting a current supplied to the plurality of lamps 120 that is used to control the switching part. In the liquid crystal display device according to embodiments of the invention, by such an inverter circuit, the external electrode fluorescent lamps 120 are driven in parallel. That is to say, a plurality of fluorescent lamps 120 are driven by a high AC voltage outputted from one transformer.

Figure 6:
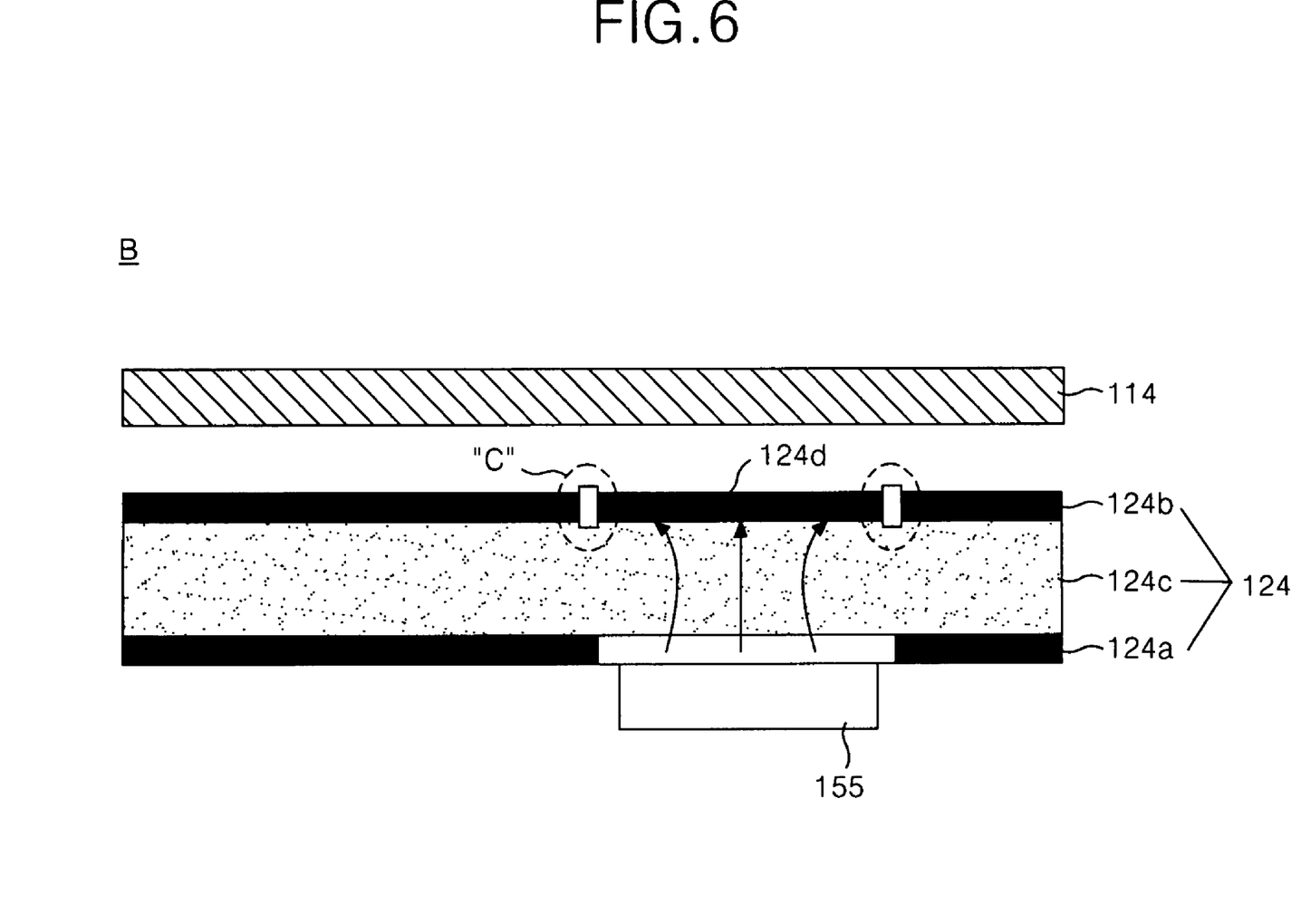
FIG. 6 is a cross-sectional diagram representing an inverter PCB and a cover bottom in detail by enlarging part 'B' of FIG. 5.
Figure 7:
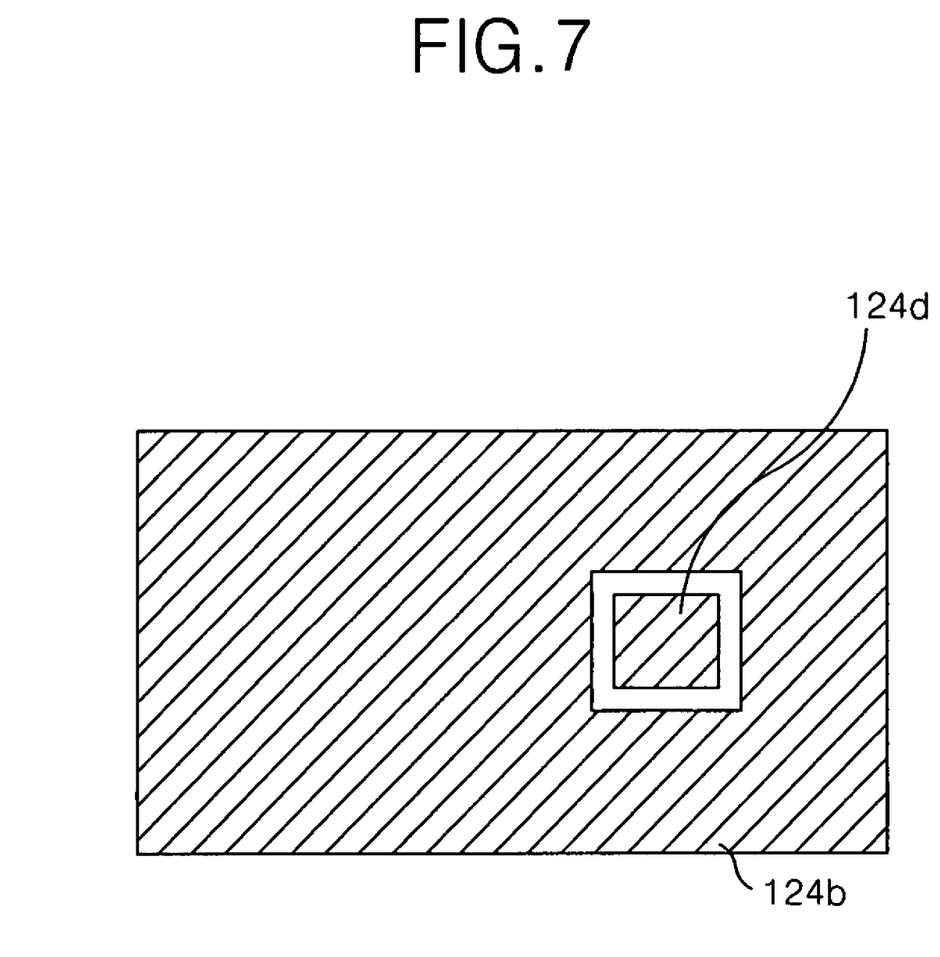
FIG. 7 is a plan view of the inverter PCB having a magnetic flux shielding film.

FIG. 6 is a cross sectional diagram representing an inverter PCB and a cover bottom in detail by enlarging part 'B' of FIG. 5, and FIG. 7 is a plan view of the inverter PCB having a magnetic flux shielding film. The inverter circuit, as shown in FIG. 6, includes a transformer 155 mounted on an upper surface of the inverter PCB 124. The inverter PCB 124 includes an epoxy glass fiber substrate 124C, a first copper thin film layer 124A on the upper surface of the epoxy glass fiber substrate 124C in an area other than where the transformer 155 is located, a second copper thin film layer 124B on the lower surface of the epoxy glass fiber substrate 124C in an area other than the area under the transformer 155, and a magnetic flux shielding film 124D on the lower surface of the epoxy glass fiber substrate 124C under the transformer 155 directly between the transformer 155 and the cover bottom 114 and insulated from the second copper thin film layer 124B. The first copper thin film layer 124A forms first metal patterns on the upper surface of the epoxy glass fiber substrate 124C in an area other than where the transformer 155 is located and the second copper thin film layer 124B can form second metal patterns on the lower surface of the epoxy glass fiber substrate 124C in an area other than the area under the transformer 155A. Circuit parts (not shown) can be further mounted on the upper surface of the epoxy glass fiber substrate 124C, and circuit wire lines (not shown) can be mounted on the lower surface of the epoxy glass fiber substrate 124C. Further, the second copper thin film layer 124B on the epoxy glass fiber substrate 124C can be grounded (earth).

In the case of the first copper thin film layer 124A on the upper surface of the epoxy glass fiber substrate 124C, the first copper thin film layer 124A is omitted near the transformer 155 in order to prevent the risk of discharge caused by the high output of the transformer 155. In the case of the second copper thin film layer 124B on the upper surface of the epoxy glass fiber substrate 124C in which the second copper thin film layer 124B is omitted to form an opening in the second copper thin film layer 124b in an area other than the area under the transformer 155, the magnetic flux shielding film 124D is coated as a copper thin film into the opening so as to prevent magnetic flux from the transformer 155 from impacting the cover bottom 114. Thus, the magnetic flux shielding film 124D prevents the magnetic flux of the transformer 155 from generating localized heating in the cover bottom 114 that can increase the temperature of the cover bottom 114 and the transformer 155 so as to cause a decrease in the efficiency of the transformer 155.

The magnetic flux shielding film 124D can be formed in the same process as the second copper thin film layer. Thus, the magnetic flux shielding film 124D can be formed of copper (Cu). Of course, if additional fabrication processes are employed, the magnetic flux shielding film 124D can be formed with aluminum (Al), nickel (Ni), and zinc (Zn), which have excellent magnetic flux shielding characteristics.

As shown in FIG. 7, the magnetic flux shielding film 124D is disposed to be separated from the second copper thin film layer 124B by a distance so that the magnetic flux shielding film 124D can be electrically isolated from the second copper thin film layer 124B (refer to part 'C'). This is because there is a risk of discharge caused by insulation destruction.

As described above, the liquid crystal display device according to embodiments of the invention include a metal shielding pattern for shielding magnetic flux of the transformer from the cover bottom of a backlight for a liquid crystal display device. Further, the liquid crystal display device according to embodiments of the invention prevents heating of the cover bottom and the transformer by the magnetic flux shielding film so as to reduce power consumption due to the transformer operating inefficiently.

It will be apparent to those skilled in the art that various modifications and variations can be made in the liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device, comprising:
    a liquid crystal display panel;
    a plurality of lamps for irradiating light onto the liquid crystal display panel;
    a cover bottom that houses the plurality of lamps;
    an inverter printed circuit board having a first surface and a second surface opposite to the first surface with an insulation base layer between the first and second surfaces, wherein the second surface is adjacent to the cover bottom;
    a transformer on the first surface of the inverter printed circuit board; and
    a metal shielding pattern for shielding magnetic flux of the transformer on the second surface of the inverter printed circuit board directly between the transformer and the cover bottom,
    a first metal pattern on the first surface in an area other than where the transformer is located,
    a second metal pattern on the second surface corresponding to the first metal pattern,
    wherein the metal shielding pattern is formed on the second surface corresponding to the transformer, and
    wherein the metal shielding pattern is electrically isolated from the second metal pattern.

2. The liquid crystal display device according to claim 1, wherein the plurality of lamps are external electrode fluorescent lamps.

3. The liquid crystal display device according to claim 1, wherein the second metal patterns are grounded.

4. The liquid crystal display device according to claim 1, wherein the metal shielding pattern includes at least one of copper, zinc, nickel and aluminum.

5. The liquid crystal display device according to claim 1, wherein the cover bottom is disposed between the lamps and the inverter printed circuit board.

6. The liquid crystal display device according to claim 1, wherein the transformer commonly drives the plurality of lamps.

7. A liquid crystal display device, comprising:
    a liquid crystal display panel;
    a plurality of lamps for irradiating light onto the liquid crystal display panel;
    a cover bottom that houses the plurality of lamps;
    a reflection sheet adhered to an inside surface of the cover bottom;
    an inverter printed circuit board at an outside surface of the cover bottom;
    a transformer on a first surface of the inverter printed circuit board; and
    a metal shielding pattern for shielding magnetic flux of the transformer positioned on the inverter printed circuit board directly between the transformer and the cover bottom,
    a first metal pattern on the first surface in an area other than where the transformer is located,
    a second metal pattern on a second surface corresponding to the first metal pattern,
    wherein the metal shielding pattern is formed on the second surface corresponding to the transformer, and
    wherein the metal shielding pattern is electrically isolated from the second metal pattern.

8. The liquid crystal display device according to claim 7, wherein the plurality of lamps are external electrode fluorescent lamps.

9. The liquid crystal display device according to claim 7, wherein the second metal patterns are grounded.

10. The liquid crystal display device according to claim 7, wherein the metal shielding pattern includes at least one of copper, zinc, nickel and aluminum.

11. The liquid crystal display device according to claim 7, wherein the cover bottom is disposed between the lamps and the inverter printed circuit board.

12. The liquid crystal display device according to claim 7, wherein the transformer commonly drives the plurality of lamps.

* * * * *